May 2, 1939.  F. A. VOLZ  2,156,907
COILABLE RULE
Filed Feb. 12, 1937
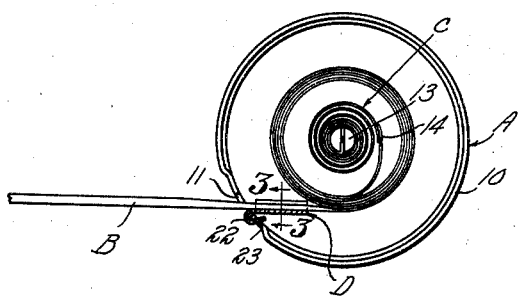
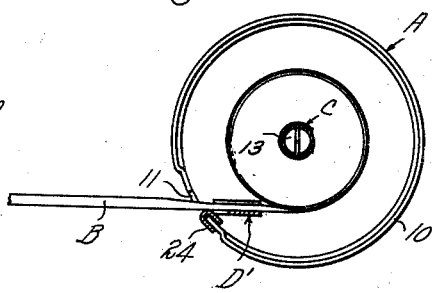
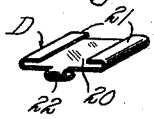
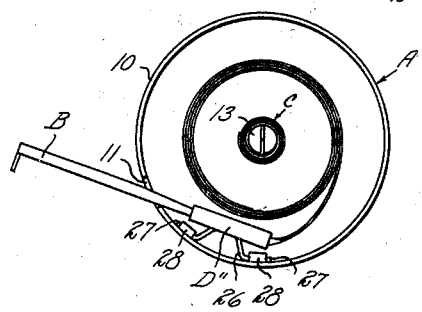
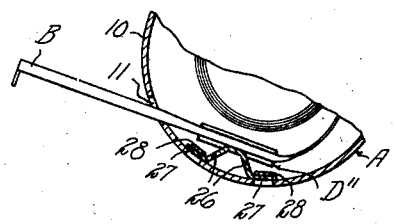
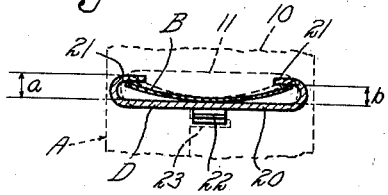
Inventor
FREDERICK A. VOLZ
By T. Clay Lindsey.
Attorney Patented May 2, 1939

2,156,907

UNITED STATES PATENT OFFICE 2,156,907

COILABLE RULE

Frederick A. Volz, New Britain, Conn., assignor to The Stanley Works, New Britain, Conn., a corporation of Connecticut Application February 12, 1937, Serial No. 125,357

3 Claims. (Cl. 33—138)

This invention relates to coilable rules of the type having a casing and a measuring tape adapted to be wound therein into an externally wound coil, the tape being in the form of a strip of metal having a bent transverse form (for example, a concavo-convex cross section) so that it will resist bending and will, when extended, automatically assume a rectilinear state or straight rod-like form.

The aim of the invention is to provide an improved rule of this character having various features of novelty and advantage and wherein the rule may be pulled out of and pushed into the casing in a smooth and easy manner and be automatically retained in any extended position without the use of ratchets or manually manipulable means for controlling or effecting the winding and unwinding operations.

In accordance with the present invention, I provide a casing having an entrance slot, a measuring tape in the form of a strip of metal having a concavo-convex cross section and adapted to be moved through the slot and to be wound in the casing into an externally wound coil, a spring within the casing for aiding the measuring tape into a coil and normally having sufficient tension or force to overcome the ordinary resistance offered by the friction of the parts and the tendency of the tape to resist bending, and means beyond the point of tangency between the extended portion and the coiled portion of the tape exerting such friction and drag on the tape as to provide a substantially balanced arrangement permitting of a pull-push operation and the maintenance of the tape in any extended position.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing wherein are shown several embodiments which the present invention may take:

Figure 1 is a side view of a measuring rule constructed in accordance with one embodiment of the invention, one-half of the casing being removed;

Fig. 2 is a perspective view of the clip of Fig. 1;

Fig. 3 is an enlarged detail view showing the friction device of Fig. 1 in transverse section, this view being taken substantially on line 3—3 of Fig. 1;

Fig. 4 is a view similar to Fig. 1 but showing another embodiment;

Fig. 5 is a similar view showing a third embodiment; and

Fig. 6 is a detail view of the arrangement shown in Fig. 5, parts being shown in section on a plane parallel to, but spaced from, the plane on which Fig. 5 is taken.

Referring more particularly to the drawing, A denotes a casing of any suitable type, the same having a peripheral wall 10 provided with an entrance slot 11. B is the measuring tape composed of a thin strip of metal having a concavo-convex section. The letter C designates a winding strip, the inner end of which is connected to a central post 13 and the outer end of which is connected to the inner end of the tape, as at 14. The winding strip or spring C has a force or tension which overbalances the resistance offered by the tendency of the tape to resist bending and the friction of the parts except that offered by the brake hereinafter described more in detail so that, if the brake were omitted, the spring would automatically and unassisted wind the tape, at least in part, into the casing.

In accordance with the present invention, I provide means cooperating with the tape and, preferably, with that portion of the tape between the entrance opening 11 and the point of tangency between the tape and the coil, for more or less flattening the tape and exerting thereon a frictional or dragging force of such character as to substantially provide a counterbalanced arrangement. The means for reducing the transverse curvature of the tape and exerting frictional drag thereon may take any suitable form. In each of the present illustrative disclosures, this means is shown as being generally in the form of a clip or flattened sleeve which forms a passageway for the tape, and which passageway is of lesser dimension in a direction at right angles to the plane of the tape than is the radial depth of the tape itself.

In the embodiment shown in Figs. 1, 2, and 3, the clip D comprises a sheet metal member having its marginal edges turned back towards each other so as to provide a bottom wall 20 and a pair of flanges 21, the distance between each flange and the bottom wall being less than the normal radial depth of the tape. The normal curvature of the tape is shown by broken lines in Fig. 3, and the normal radial depth of the tape is indicated by the dimension $a$ in that figure. The depth of the channel or passage formed by the clip is designated by the dimension $b$, it being understood that the dimension $b$ is less than the dimension $a$. It is clear that, since the depth of the channel is less than the normal radial depth of the tape, that portion of the tape within the channel has its curvature increased, that is to say, the tape is somewhat flattened causing the tape at its central portion to bear against the bottom wall 20 and its marginal portions against the flanges 21 and thereby insuring frictional engagement between the tape and the clip.

In the embodiment shown in Figs. 1, 2, and 3, the clip is pivoted to the casing, preferably adjacent the mouth of the casing, in order that the clip may automatically change its angular position as the coil, into which the tape is wound, changes in size, this being desirable so as to permit the extended portion of the tape to be substantially tangential to the coil at the point of tangency at all times. In this disclosure, the clip is provided, at its forward edge, with an integral hook 22, and the casing, adjacent the edge of the opening, is provided with a slot 23 for accommodating the hook.

In the embodiment shown in Fig. 4, the clip D', which is generally similar to the clip shown in the preceding embodiment, has a U-shaped attaching portion 24 adapted to straddle one edge of the entrance slot 11.

In the embodiment shown in Figs. 5 and 6, the clip D'' is secured to the peripheral wall of the casing inwardly of the mouth or entrance slot 11 thereof. In this instance, the bottom wall of the clip has struck therefrom two arms 26 provided with feet 27 engaging the peripheral wall of the casing and held thereagainst by lugs 28 struck from the peripheral wall of the casing.

It will be seen, from the foregoing description taken in connection with the accompanying drawing, that in each of the embodiments illustrated the clip flattens the portion of the tape passing therethrough resulting in frictional engagement which, together with the normal friction between the parts and the tendency of the tape to resist bending, substantially counterbalances the winding spring, thus producing an arrangement wherein the tape may be pushed into and pulled out of the casing and wherein the tape will be automatically maintained in any extended position. The construction is very simple, practical, and inexpensive to manufacture and is very efficient and reliable in operation.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coilable measuring device of the character described, a resilient measuring tape having a transverse curvature and an inherent tendency to assume a rectilinear state, a casing having a peripheral wall provided with an entrance slot through which said tape is moved, a winding spring within the casing and secured to the inner end of said tape for aiding the measuring tape into a coil, and a clip adjacent to said entrance slot and comprising a generally flattened sleeve having a passageway through which the tape projects, said passageway being of lesser depth than is the sagitta of the arc formed by the tape itself.

2. In a coilable measuring device of the character described, a resilient measuring tape having a transverse curvature and an inherent tendency to assume a rectilinear state, a circular casing having a peripheral wall provided with an entrance slot through which said tape is moved, a winding spring within the casing and secured to the inner end of said tape for aiding the measuring tape into a coil, and a clip comprising a generally flattened sleeve having a passageway through which the tape projects, said passageway being of lesser depth than is the sagitta of the arc formed by the normal tape itself, said clip being located within said casing adjacent said entrance slot and having an ear at its forward end for securing the same to the casing.

3. In a coilable measuring device of the character described, a resilient measuring tape having a transverse curvature and an inherent tendency to assume a rectilinear state, a casing having a peripheral wall provided with an entrance slot through which said tape is moved, a winding spring within the casing for aiding the tape into a coil, and a clip pivoted to said casing adjacent said slot the axis of the pivot being parallel to the chord of an adjacent cross section of the tape and said clip comprising a generally flattened sleeve having a passageway through which the tape projects, said passageway being of lesser depth than is the sagitta of the arc formed by the tape itself.

FREDERICK A. VOLZ.